(12) United States Patent
Salter et al.

(10) Patent No.: US 9,499,113 B2
(45) Date of Patent: Nov. 22, 2016

(54) LUMINESCENT GRILLE BAR ASSEMBLY

(71) Applicant: Ford Global Technologies, LLC, Dearborn, MI (US)

(72) Inventors: Stuart C. Salter, White Lake, MI (US); Cornel Lewis Gardner, Romulus, MI (US); James J. Surman, Clinton Township, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/067,655

(22) Filed: Mar. 11, 2016

(65) Prior Publication Data

US 2016/0195242 A1 Jul. 7, 2016

Related U.S. Application Data

(63) Continuation-in-part of application No. 14/519,845, filed on Oct. 21, 2014, which is a continuation-in-part of application No. 14/086,442, filed on Nov. 21, 2013.

(51) Int. Cl.
| | |
|---|---|
| *F21V 9/16* | (2006.01) |
| *B60R 19/52* | (2006.01) |
| *B60Q 1/26* | (2006.01) |
| *F21S 8/10* | (2006.01) |

(52) U.S. Cl.
CPC ............ *B60R 19/52* (2013.01); *B60Q 1/2661* (2013.01); *F21S 48/214* (2013.01); *F21S 48/2212* (2013.01); *F21V 9/16* (2013.01); *B60Q 2400/20* (2013.01); *B60R 2019/525* (2013.01)

(58) Field of Classification Search
CPC B60Q 1/2661; B60Q 2400/20; B60R 19/52; B60R 2019/525; F21S 48/214; F21S 48/2212; F21V 9/16
See application file for complete search history.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,733,161 B2 | 5/2004 | Tufte |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |

(Continued)

FOREIGN PATENT DOCUMENTS

| | | |
|---|---|---|
| CN | 2928593 Y | 8/2007 |
| CN | 101337492 A | 1/2009 |

(Continued)

*Primary Examiner* — Stephen F Husar
(74) *Attorney, Agent, or Firm* — Jason Rogers; Price Heneveld LLP

(57) ABSTRACT

A grille assembly of a vehicle is provided herein and includes at least one grille bar. A first photoluminescent structure is provided at a first location of the at least one grille bar and is configured to luminesce when excited by light emitted from a light source. A second photoluminescent structure is provided at a second location of the at least one grille bar and is configured to luminesce when excited by light emitted from the first photoluminescent structure.

20 Claims, 3 Drawing Sheets

(56) References Cited

U.S. PATENT DOCUMENTS

| | | |
|---|---|---|
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,434,294 B2 * | 9/2016 | Salter ................... B60Q 1/0011 |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0138807 A1 * | 5/2015 | Salter ................... F21S 48/2212 362/510 |
| 2015/0267881 A1 | 9/2015 | Salter et al. |
| 2016/0016506 A1 | 1/2016 | Collins et al. |
| 2016/0185284 A1 * | 6/2016 | Salter ....................... B60Q 1/50 362/510 |

FOREIGN PATENT DOCUMENTS

| | | |
|---|---|---|
| CN | 201169230 Y | 2/2009 |
| CN | 201193011 Y | 2/2009 |
| CN | 103043013 A | 4/2013 |
| CN | 202944278 U | 5/2013 |
| CN | 204127823 U | 1/2015 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238963 A | 9/2007 |
| JP | 2013241169 A | 12/2013 |
| WO | 2006047306 A1 | 5/2006 |
| WO | 2014068440 A1 | 5/2014 |

* cited by examiner

US 9,499,113 B2

LUMINESCENT GRILLE BAR ASSEMBLY

CROSS-REFERENCE TO RELATED APPLICATIONS

This application is a continuation-in-part of U.S. patent application Ser. No. 14/519,845, filed Oct. 21, 2014, entitled "LUMINESCENT GRILLE BAR ASSEMBLY," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a grille assembly of a vehicle is provided and includes at least one grille bar. A first photoluminescent structure is provided at a first location of the at least one grille bar and is configured to luminesce when excited by light emitted from a light source. A second photoluminescent structure is provided at a second location of the at least one grille bar and is configured to luminesce when excited by light emitted from the first photoluminescent structure.

According to another aspect of the present invention, a grille assembly of a vehicle is provided and includes a plurality of grille bars. A first photoluminescent structure is provided at a front portion of each grille bar and is configured to luminesce when excited by light emitted from a light source. A second photoluminescent structure is provided at a rear portion of each grille bar and is configured to luminesce when excited by light emitted from the first photoluminescent structure.

According to another aspect of the present invention, a grille assembly of a vehicle is provided and includes a plurality of grille bars. A first photoluminescent structure is provided at a front portion of each grille bar and is configured to luminesce when excited by light emitted from a light source. A second photoluminescent structure is provided at a rear portion of each grille bar and is configured to luminesce when excited by light emitted from the first photoluminescent structure. At least one of the first and second photoluminescent structures is configured to continue to luminesce for a period of time after excitation light ceases to be provided.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
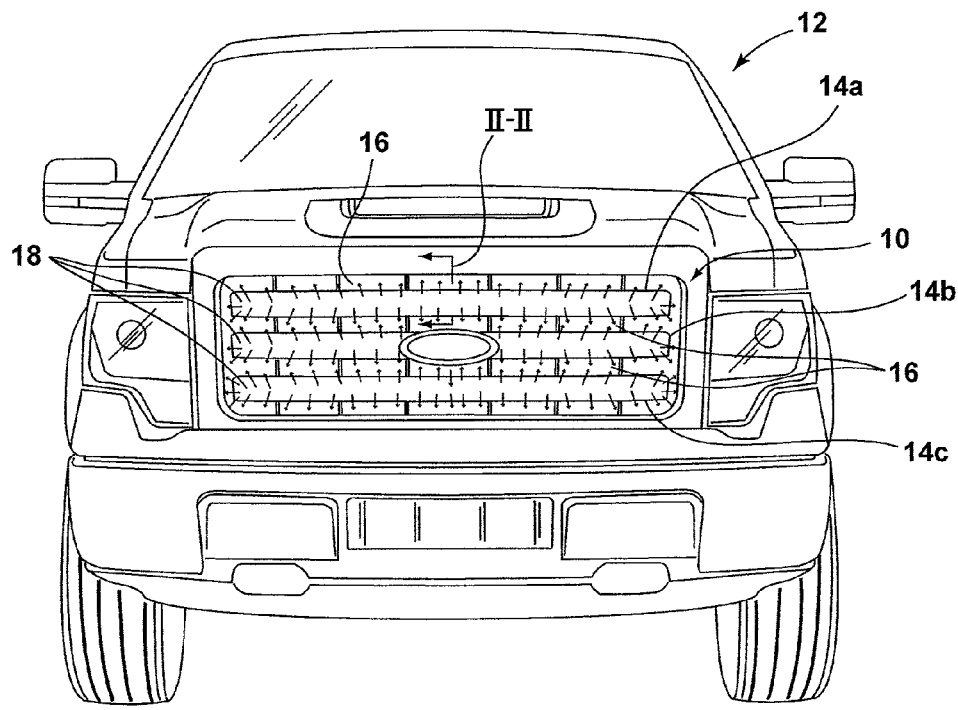
FIG. 1 illustrates one embodiment of a luminescent grille assembly of a vehicle, according to one embodiment.

Referring to FIG. 1, a grille assembly 10 of a vehicle 12 is shown from the vantage point of an onlooker looking head on at the vehicle 12. The grille assembly 10 can be conventionally mounted to the vehicle and generally functions to allow cooling air to enter the engine compartment while also protecting various parts therein such as the engine and the radiator. As described in greater detail herein, the grille assembly 10 may also function as a styling element that is used to enhance the appearance of the vehicle 12. In the presently illustrated embodiment, the grille assembly 10 includes a plurality of grille bars, exemplarily shown as grille bars 14a-14c. The grille bars 14a-14c are arranged in parallel and extend horizontally across the front of the vehicle 12. In alternative embodiments, the grille assembly 10 may include a number of grille bars in other arrangements. For example, the grille bars may be arranged in a linear and/or non-linear configuration of varying lengths and widths. It is contemplated that the grille bars may be arranged vertically or in a variety of patterns. With respect to the presently illustrated embodiment, the grille bars 14a-14c are arranged in a vertical stack and are spaced apart. As shown in FIG. 1, reference numeral 16 generally designates the space between and around the grille bars 14a-14c and through which air is able to enter the engine compartment. As will be described below in greater detail, the grille assembly 10 may be configured to provide one or more distinct lighting functions.

According to one embodiment, each grille bar 14a-14c includes a front portion 18 that illuminates in a first color and a rear portion (not shown) that illuminates in a second color. It is contemplated that the first and second colors may be the same or may be visually distinct from one another. As generally represented by arrows stemming from the front portion 18 of each grille bar 14a-14c, light emitted therefrom is outputted in a vehicle-forward direction whereas light outputted from the rear portion illuminates an area behind the grille assembly 10 and is visible through the space 16 of the grille assembly 10. In embodiments where the first and second colors are different, the contrast in illumination imparts a distinct styling element to the grille assembly 10.

Figure 2:
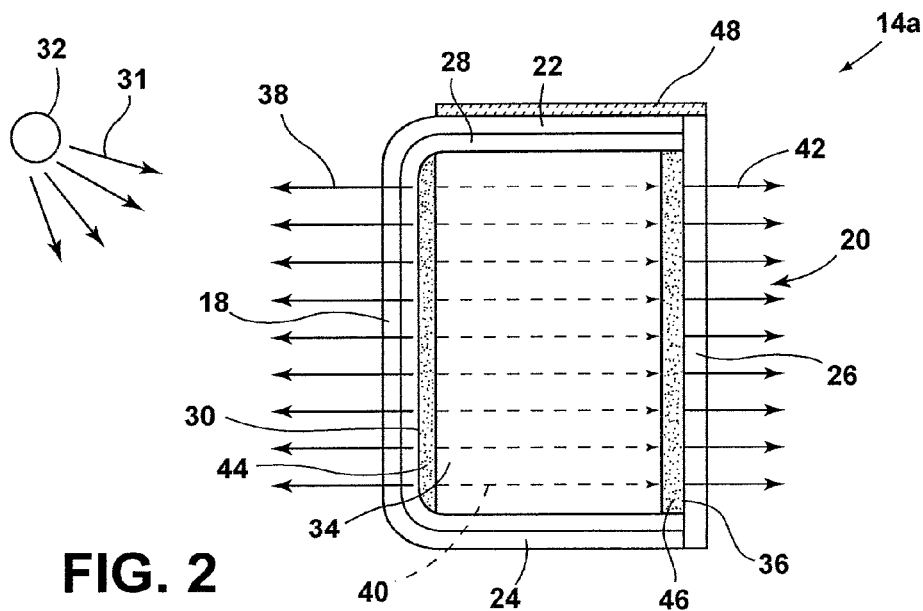
FIG. 2 is a cross-sectional view of one embodiment of a grille bar taken along line II-II of FIG. 1.

Referring to FIG. 2, a cross-section of grille bar 14a is shown according to one embodiment. It is to be understood that grille bars 14b and 14c may be similarly configured. The grille bar 14a includes a housing 20 defined by front portion 18, top portion 22, bottom portion 24, and rear portion 26, all of which may be constructed from a rigid material that is substantially light-permeable, such as, but not limited to, plastic. The front, top, and bottom portions 18, 22, 24 may be embodied in a one-piece U-shaped configuration that is assembled to the rear portion 26 via sonic or laser welding. Alternatively, the housing 20 may benefit from unitary construction via low-pressure insert molding. It is to be understood that the housing 20 may configured in other shapes, if desired, without departing from the teachings herein.

According to the illustrated embodiment of FIG. 2, portions of the housing 20 that are readily visible may be metalized to give the grille bar 14a a metallic appearance when the vehicle 12 is viewed head on. For example, a metallic layer 28 may be applied to the underside of the front, top, and bottom portions 18, 22, 24 via partial vacuum deposition. A first photoluminescent structure 30 is provided at a first location corresponding to the front portion 18 of the housing 20 and is configured to luminesce when excited by light 31 emitted from a light source 32. With respect to the embodiments described herein, the light source 32 includes any light sources external to the grille assembly 10 such as natural light sources (e.g., sunlight) and artificial light sources e.g., street light). As shown in FIG. 2, the first photoluminescent structure 30 is disposed on the underside of the front portion 18 and is located in an interior space 34 of the housing 20. In the presently illustrated embodiment, the first photoluminescent structure 30 is directly coated to the metallic layer 28 and may extend to cover portions of the metallic layer 28 that are located on the top and bottom portions 22, 24 of the housing 20 in alternative embodiments. Accordingly, the metallic layer 28 should be light permeable to allow light emitted by the light source 32 to pass therethrough and be received by the first photoluminescent structure 30.

As is further shown in FIG. 2, a second photoluminescent structure 36 is provided at a second location corresponding to the rear portion 26 of the housing 20 and is configured to luminesce when excited by light emitted from the first photoluminescent structure 30. The second photoluminescent structure 36 may be directly coated to the rear portion 26 or otherwise coupled thereto. Alternatively, the first and second photoluminescent structures 30, 36 may be injection molded or thermoformed to their corresponding locations in the housing member 20. In the presently illustrated embodiment, the first photoluminescent structure 30 exhibits Lambertian emittance as generally demonstrated by a first portion of light 38 emitted from the first photoluminescent structure 30 being outputted from the grille bar 14a in a vehicle-forward direction and a second portion of light 40 emitted from the first photoluminescent structure 30 being outputted in a vehicle-rearward direction toward the second photoluminescent structure 36. The second photoluminescent structure 36 is configured to be excited by the second portion of light 40 emitted from the first photoluminescent structure 30, and in response, emits light 42 that illuminates the area behind the grille assembly 10 and is visible through the space 16 of the grille assembly 10 when the vehicle 12 is viewed head on.

Figure 3:
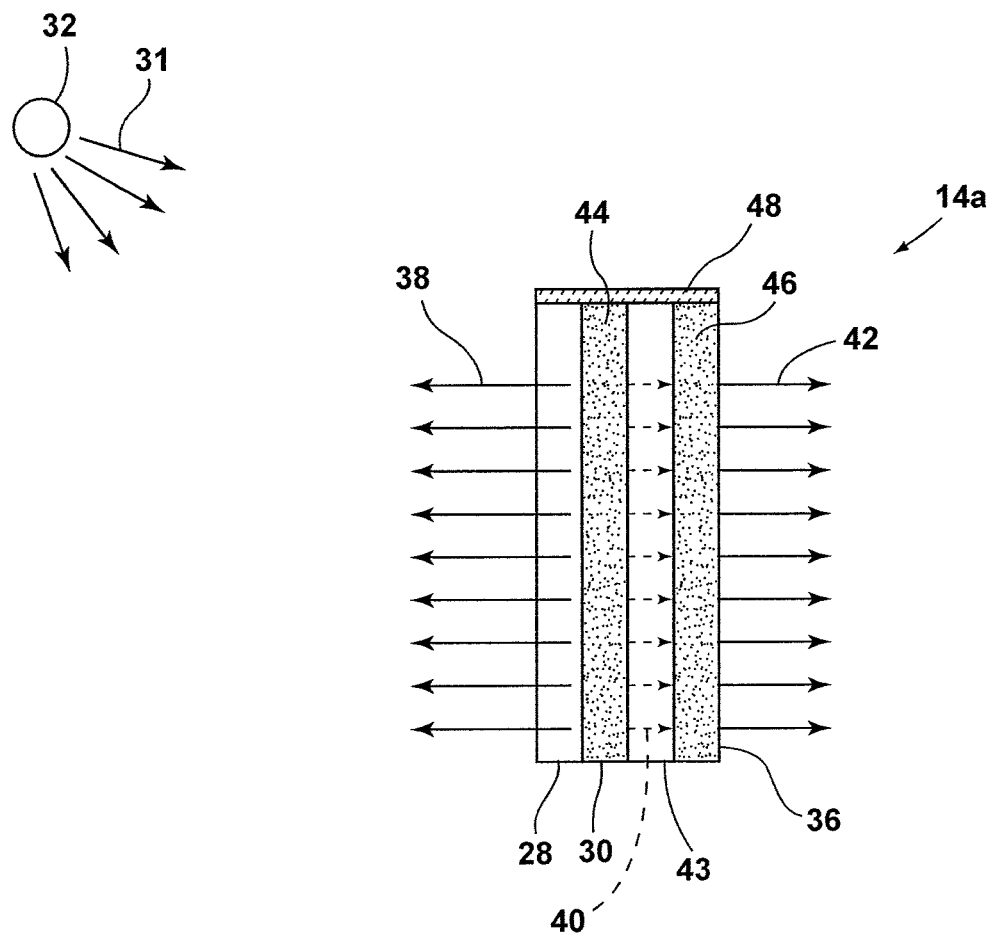
FIG. 3 illustrates an alternative embodiment of the grille bar of FIG. 2.

Referring to FIG. 3, the grille bar 14a is shown according to an alternative embodiment. As shown, the grille bar 14a may have a stacked arrangement that includes an optical member 43, which may be constructed from a clear plastic. The first photoluminescent structure 30 followed by the metallic layer 28 are each coupled to one side of the optical member 43 that faces forward of the vehicle 12 whereas the second photoluminescent structure 36 is coupled to an opposing side of the optical member 43 that faces rearward of the vehicle 12. In operation, the first photoluminescent structure 30 luminesces when excited by light 31 emitted from the light source 32. The first photoluminescent structure 30 exhibits Lambertian emittance as generally demonstrated by the first portion of light 38 emitted from the first photoluminescent structure 30 being outputted from the grille bar 14a in a vehicle-forward direction and the second portion of light 40 emitted from the first photoluminescent structure 30 being outputted in a vehicle-rearward direction and transmitted through the optical member 43 toward the second photoluminescent structure 36. The second photoluminescent structure 36 is excited by the second portion of light 40 emitted from the first photoluminescent structure 30, and in response, emits light 42 that illuminates the area behind the grille assembly 10 and is visible through the space 16 of the grille assembly 10 when the vehicle 12 is viewed head on.

With reference to FIGS. 2 and 3, the first and second photoluminescent structures 30, 36 each include long-persistence phosphors 44, 46, which continue to luminesce for a period of time after excitation light ceases to be provided. Or in other words, the first photoluminescent structure 30 may be configured to continue to luminesce once light 31 provided by light source 32 is no longer available. Likewise, the second photoluminescent structure 36 may be configured to continue to luminesce once light 40 provided by the first photoluminescent structure 30 is no longer available. The long-persistence phosphors 44, 46 may be defined as being able to store excitation light and release light gradually, for a period of several minutes or hours. The decay time may be defined as the time between the end of excitation and the moment when the light intensity of a given photoluminescent structure 30, 36 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art. Accordingly, the first and second photoluminescent structures 30, 36 may be operable to emit light at or above an intensity of 0.32 mcd/m$^2$ after a period of 10 minutes. Additionally, the first and second photoluminescent structures 30, 36 may be operable to emit light above or at an intensity of 0.32 mcd/m$^2$ after a period of 30 minutes and, in some embodiments, for a period substantially longer than 60 minutes (e.g., the period may extend 8 hours or longer).

The long-persistence phosphors 44, 46 may correspond to alkaline earth aluminates and silicates, for example doped di-silicates, or any other compound that is capable of emitting light for a period of time once excitation light is no longer present. The long-persistence phosphors may be doped with one or more ions, which may correspond to rare earth elements, for example, Eu$^{2+}$, Tb$^{3+}$ and/or Dy$^3$. According to one embodiment, the first and second photoluminescent structures 30, 36 may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

In operation, the first and second photoluminescent structures 30, 36 may be formulated to luminesce in the same color or a different color upon becoming excited. It is contemplated that light given off by the first and second photoluminescent structures 30, 36 may include any colored light found in the RGB scale, including white light. According to one embodiment, light source 32 may correspond to sunlight, in which case the first photoluminescent structure 30 may be configured to convert ultraviolet (UV) light into blue light. In such a configuration, the second photoluminescent structure 36 may be configured to convert blue light into a different color of light, such as, but not limited to, red light. This contrast in color imparts a stylistic element to the grille assembly 10 and through the employ of long-persistence phosphors, the illumination provided by the first and second photoluminescent structures 30, 36 can persist well after light excitation ceases to be available. It will be understood that the compositions provided herein are non-limiting examples. Thus, any long-persistence phosphor known in the art may be utilized without departing from the teachings provided herein. Moreover, it is contemplated that other phosphors, which do not necessarily exhibit long-persistence qualities, may also be utilized without departing from the teachings provided herein.

Additional information regarding the production of long-persistence photoluminescent structures is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012; U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENCE LUMINESCENCE," issued Feb. 10, 2015, all of which are incorporated herein by reference in their entirety.

Figure 4:
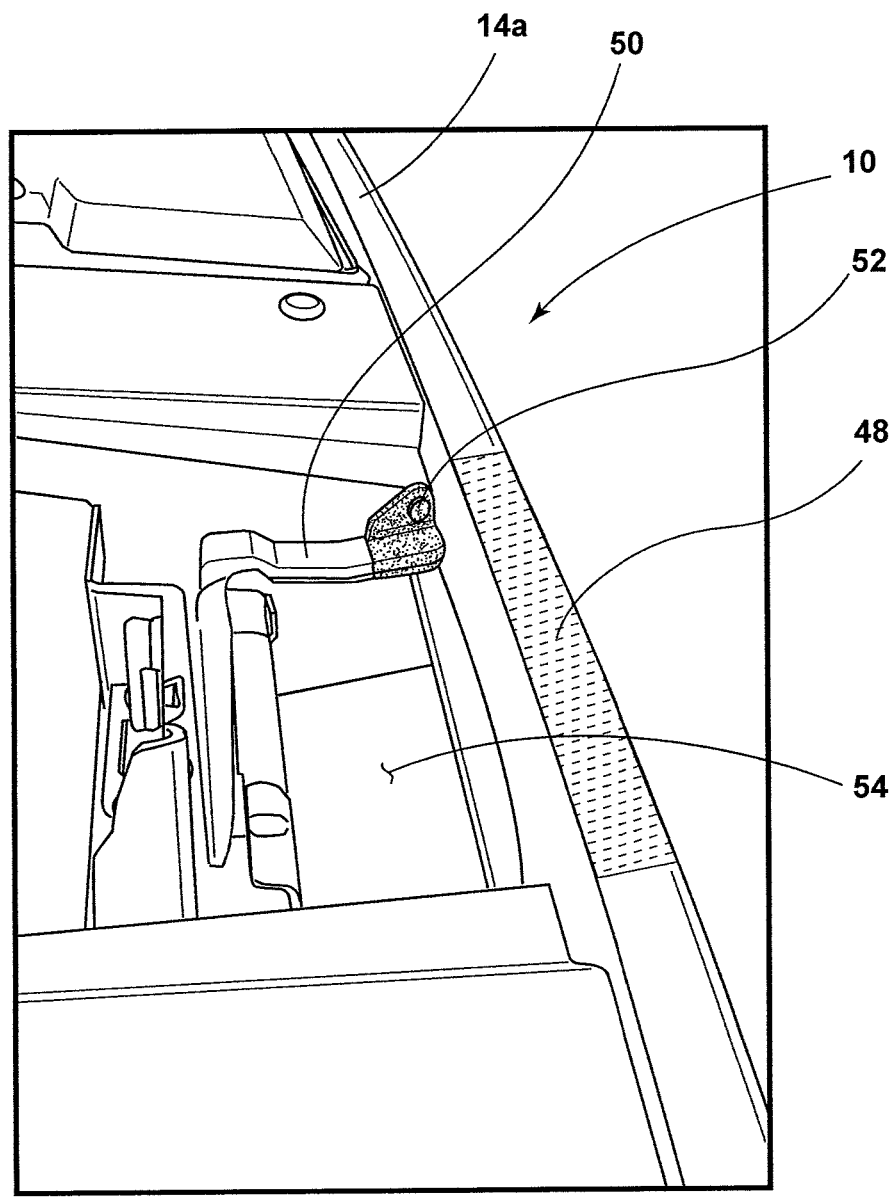
FIG. 4 illustrates one embodiment of a vehicle hood latch having a photoluminescent structure provided thereon.

Referring now to FIGS. 2-4, the grille bar 14a may additionally be configured with a light-reflecting member 48 configured to direct light 31 received from the light source 32 toward a hood latch 50 having a third photoluminescent structure 52 provided thereon and disposed in a hood latch area 54 behind the grille assembly 10. With respect to the embodiments described herein, it is generally assumed that the hood latch 50 is positioned proximate the grille bar 14a and may be engaged through the space 16 of the grille assembly 10. According to one embodiment, the hood latch 50 may be positioned slightly above grille bar 14a, in which case the light-reflecting member 48 may be disposed atop the top portion 22 of the housing member 20 as shown in FIG. 2 or atop the stacked arrangement as shown in FIG. 3. The light-reflecting member 48 may be embodied as a reflective film for directing light 31 in a general upward direction. In alternative embodiments, the housing member 20 may include optics or other structures to collect light 31 and direct it toward the hood latch 50. In operation, the light-reflecting member 48 directs light 31 toward the hood latch 50 to be received by the third photoluminescent structure 52. The third photoluminescent structure 52 is configured to luminesce when excited by light 31, thereby enabling the hood latch 50 to be more easily seen through the space 16 of the grille assembly 10 and also providing a stylistic element. The third photoluminescent structure 52 may include long-persistence phosphors and encompass the entirety or portions of the hood latch 50. Additionally, the third photoluminescent structure 52 may be configured to convert light 31 into a visible light found in the RGB scale and the color of the light expressed by the third photoluminescent structure 52 may be similar or different than that expressed by the first and second photoluminescent structures 30, 36. It is to be understood that grille bars 14b and 14c may also include light-reflecting member 48 depending on the location of the hood latch 50 and the ability in which to supply light 31 to the third photoluminescent structure 52. Furthermore, it is contemplated that structural surfaces in the hood latch area 54 may also be configured to reflect light 31, thereby maximizing the amount of light 31 received by the third photoluminescent structure 52.

Accordingly a grille bar assembly 10 has been advantageously described herein. The bar assembly 10 provides various benefits including an efficient and cost-effective means to produce a variety of illumination to provide a distinct styling element on a vehicle 12.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject flatter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A grille assembly of a vehicle, comprising:
   at least one grille bar;
   a first photoluminescent structure provided at a first location of the at least one grille bar and configured to luminesce when excited by light emitted from a light source; and
   a second photoluminescent structure provided at a second location of the at least one grille bar and configured to luminesce when excited by light emitted from the first photoluminescent structure.
2. The grille assembly of claim 1, wherein the first location comprises a front portion of the at least one grille bar and the second location comprises a rear portion of the at least one grille bar.
3. The grille assembly of claim 2, wherein a first portion of light emitted from the first photoluminescent structure is outputted in a vehicle-forward direction and a second portion of emitted from the first photoluminescent structure is outputted in a vehicle-rearward direction.
4. The grille assembly of claim 3, wherein the second photoluminescent structure is excited by the second portion of light emitted from the first photoluminescent structure, and wherein light emitted by the second photoluminescent structure illuminates an area behind the grille assembly and is visible through at least one space in the grille assembly when the vehicle is viewed head on.

5. The grille assembly of claim 1, wherein the first photoluminescent structure luminesces in a first color and the second photoluminescent luminesces in a second color that is visually distinct from the first color.

6. The grille assembly of claim 1, wherein the at least one grille bar is light-permeable and visible portions of the at least one grille bar are metallized to impart a metallic appearance thereto.

7. The grille assembly of claim 1, wherein the at least one grille bar comprises a light-reflecting member configured to direct light received from the light source toward a hood latch, and wherein a third photoluminescent structure is provided on the hood latch and is configured to luminesce when excited by light received from the light-reflecting member.

8. The grille assembly of claim 1, wherein at least one of the first and second photoluminescent structures is configured to continue to luminesce for a period of time after excitation light ceases to be provided.

9. A grille assembly of a vehicle, comprising:
a plurality of grille bars;
a first photoluminescent structure provided at a front portion of each grille bar and configured to luminesce when excited by light emitted from a light source; and
a second photoluminescent structure provided at a rear portion of each grille bar and configured to luminesce when excited by light emitted from the first photoluminescent structure.

10. The grille assembly of claim 9, wherein a first portion of light emitted from the first photoluminescent structure is outputted in a vehicle-forward direction and a second portion of light emitted from the first photoluminescent structure is outputted in a vehicle-rearward direction.

11. The grille assembly of claim 10, wherein the second photoluminescent structure is excited by the second portion of light emitted from the first photoluminescent structure, and wherein light emitted by the second photoluminescent structure illuminates an area behind the grille assembly and is visible through a plurality of spaces between the grille bars when the vehicle is viewed head on.

12. The grille assembly of claim 9, wherein the first photoluminescent structure luminesces in a first color and the second photoluminescent luminesces in a second color that is visually distinct from the first color.

13. The grille assembly of claim 9, wherein each grille bar is light-permeable and visible portions of each grille bar are metallized to impart a metallic appearance thereto.

14. The grille assembly of claim 9, wherein at least one grille bar comprises a light-reflecting member configured to direct light received from the light source toward a hood latch, and wherein a third photoluminescent structure is provided on the hood latch and is configured to luminesce when excited by light received from the light-reflecting member.

15. The grille assembly of claim 9, wherein at least one of the first and second photoluminescent structures is configured to continue to luminesce for a period of time after excitation light ceases to be provided.

16. A grille assembly of a vehicle, comprising:
a plurality of grille bars;
a first photoluminescent structure provided at a front portion of each grille bar and configured to luminesce when excited by light emitted from a light source; and
a second photoluminescent structure provided at a rear portion of each grille bar and configured to luminesce when excited by light emitted from the first photoluminescent structure;
wherein at least one of the first and second photoluminescent structures is configured to continue to luminesce for a period of time after excitation light ceases to be provided.

17. The grille assembly of claim 16, wherein a first portion of light emitted from the first photoluminescent structure is outputted in a vehicle-forward direction and a second portion of light emitted from the first photoluminescent structure is outputted in a vehicle-rearward direction.

18. The grille assembly of claim 17, wherein the second photoluminescent structure is excited by the second portion of light emitted from the first photoluminescent structure, and wherein light emitted by the second photoluminescent structure illuminates an area behind the grille assembly and is visible through a plurality of spaces between the grille bars when the vehicle is viewed head on.

19. The grille assembly of claim 16, wherein the first photoluminescent structure luminesces in a first color and the second photoluminescent luminesces in a second color that is visually distinct from the first color.

20. The grille assembly of claim 16, wherein at least one grille bar comprises a light-reflecting member configured to direct light received from the light source toward a hood latch, and wherein a third photoluminescent structure is provided on the hood latch and is configured to luminesce when excited by light received from the light-reflecting member.

* * * * *